(12) United States Patent
Shin et al.

(10) Patent No.: US 12,395,767 B2
(45) Date of Patent: Aug. 19, 2025

(54) LOW-POWER INTEGRATED BEAM STEERING SWITCH MATRIX PLATFORM

(71) Applicant: The Trustees of Columbia University in the City of New York, New York, NY (US)

(72) Inventors: Min Chul Shin, New York, NY (US); Michal Lipson, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 222 days.

(21) Appl. No.: 18/046,672

(22) Filed: Oct. 14, 2022

(65) Prior Publication Data
US 2023/0118658 A1 Apr. 20, 2023

Related U.S. Application Data

(60) Provisional application No. 63/256,401, filed on Oct. 15, 2021.

(51) Int. Cl.
*H04Q 11/00* (2006.01)

(52) U.S. Cl.
CPC . *H04Q 11/0005* (2013.01); *H04Q 2011/0058* (2013.01)

(58) Field of Classification Search
CPC .................................................. H04Q 11/00
USPC .......................................................... 385/17
See application file for complete search history.

(56) References Cited

U.S. PATENT DOCUMENTS

| | | | |
|---|---|---|---|
| 10,788,340 B1* | 9/2020 | Tin | G01S 17/88 |
| 10,788,582 B2 | 9/2020 | Feng et al. | |
| 10,802,220 B1 | 10/2020 | Miller et al. | |
| 10,901,293 B1 | 1/2021 | Guo et al. | |
| 11,024,669 B2 | 6/2021 | Rezk et al. | |
| 11,079,541 B2 | 8/2021 | Baba et al. | |
| 11,100,805 B2 | 8/2021 | Salter et al. | |
| 11,885,887 B1* | 1/2024 | Mazed | G01S 17/89 |

(Continued)

FOREIGN PATENT DOCUMENTS

| | | | | |
|---|---|---|---|---|
| CN | 105474215 B | * | 3/2019 | G02F 1/377 |
| WO | WO-2023049984 A1 | * | 4/2023 | G02B 6/125 |

OTHER PUBLICATIONS

Aflatouni et al., "Nanophotonic projection system", Optics Express, Aug. 2015, vol. 23, issue 16, pp. 21012-21022.

(Continued)

*Primary Examiner* — Kaveh C Kianni
(74) *Attorney, Agent, or Firm* — BakerHostetler

(57) ABSTRACT

Methods and systems are described for emission and/or sensing of optical signals. An example method may comprise supplying an optical signal an optical signal to a first waveguide extending in a first direction and supplying, based on controlling at least one of a first plurality of optical elements, the optical signal to at least one of a plurality of second waveguides extending in a second direction different from the first direction. The method may comprise supplying, based on controlling at least one of a second plurality of optical elements, the optical signal to at least one emitter. Each of the second plurality of optical elements may be separately selectable to control a corresponding emitter. The method may comprise causing, via the at least one emitter, emission of one or more optical signals.

14 Claims, 19 Drawing Sheets

(56) References Cited

U.S. PATENT DOCUMENTS

| | | | |
|---|---|---|---|
| 11,892,746 B1* | 2/2024 | Mazed | G02F 1/212 |
| 2004/0175174 A1* | 9/2004 | Suhami | G02F 7/00 |
| | | | 398/43 |
| 2007/0055402 A1* | 3/2007 | Guez | G05B 17/02 |
| | | | 700/104 |
| 2017/0176780 A1* | 6/2017 | Levy | G02B 6/29338 |
| 2018/0034550 A1* | 2/2018 | Rakich | H04B 10/516 |
| 2019/0391243 A1* | 12/2019 | Nicolaescu | G01S 17/42 |
| 2022/0011409 A1* | 1/2022 | Hosseini | G01S 7/4811 |
| 2024/0275044 A1* | 8/2024 | Lipson | G01S 17/42 |

OTHER PUBLICATIONS

Chang et al., "2D beam steerer based on metalens on silicon photonics", Opt. Exp., Jan. 2021, vol. 29, No. 2, pp. 854-864.

Fatemi et al., "A nonuniform sparse 2-D large-FOV opitcal phased array with a low-power PWM drive", IEEE Journal of Sold-State Circuits, 2019, vol. 54, Issue 5, pp. 1200-1215.

Kazemian et al., "Optimization of the silicon-based aperiodic optical phased array antenna", Optics Letters, Feb. 15, 2021, vol. 46, Issue 4, pp. 801-804.

Kim et al., "Compact solid-state optical phased array beam scanners based on polymeric photonic integrated circuits", Scientific Reports, 2021, vol. 11, Issue 1, Article 10576, pp. 1-9.

Liu et al., "A single-chip multi-beam steering optical phased array: design rules and simulations", Optics Express, 2021, vol. 29, Issue 5, pp. 7049-7059.

Liu et al., "Ultrafast speed, large angle, and high resolution optical beam steering using widely tunable lasers", OSA Continium, 2019, vol. 2, Issue 5, pp. 1746-1753.

Miller et al., "Large-scale optical phased array using a low-power multi-pass silicone platform", Optical, 2020, vol. 7, No. 1, pp. 3-6.

Shin et al., "Chip-scale blue light phased array", Optical Letters, 2020, vol. 45, No. 7, pp. 1934-1937.

White et al., "A silicon photonics computational lensless active-flat-optics imaging systems", Scientific Reports, 2020, vol. 10, Article 1689, pp. 1-10.

Xiao et al., "Optical phased-array beam steering controlled by wavelength", Applied Optics, 2005, vol. 44, Issue 26, pp. 5429-5433.

* cited by examiner

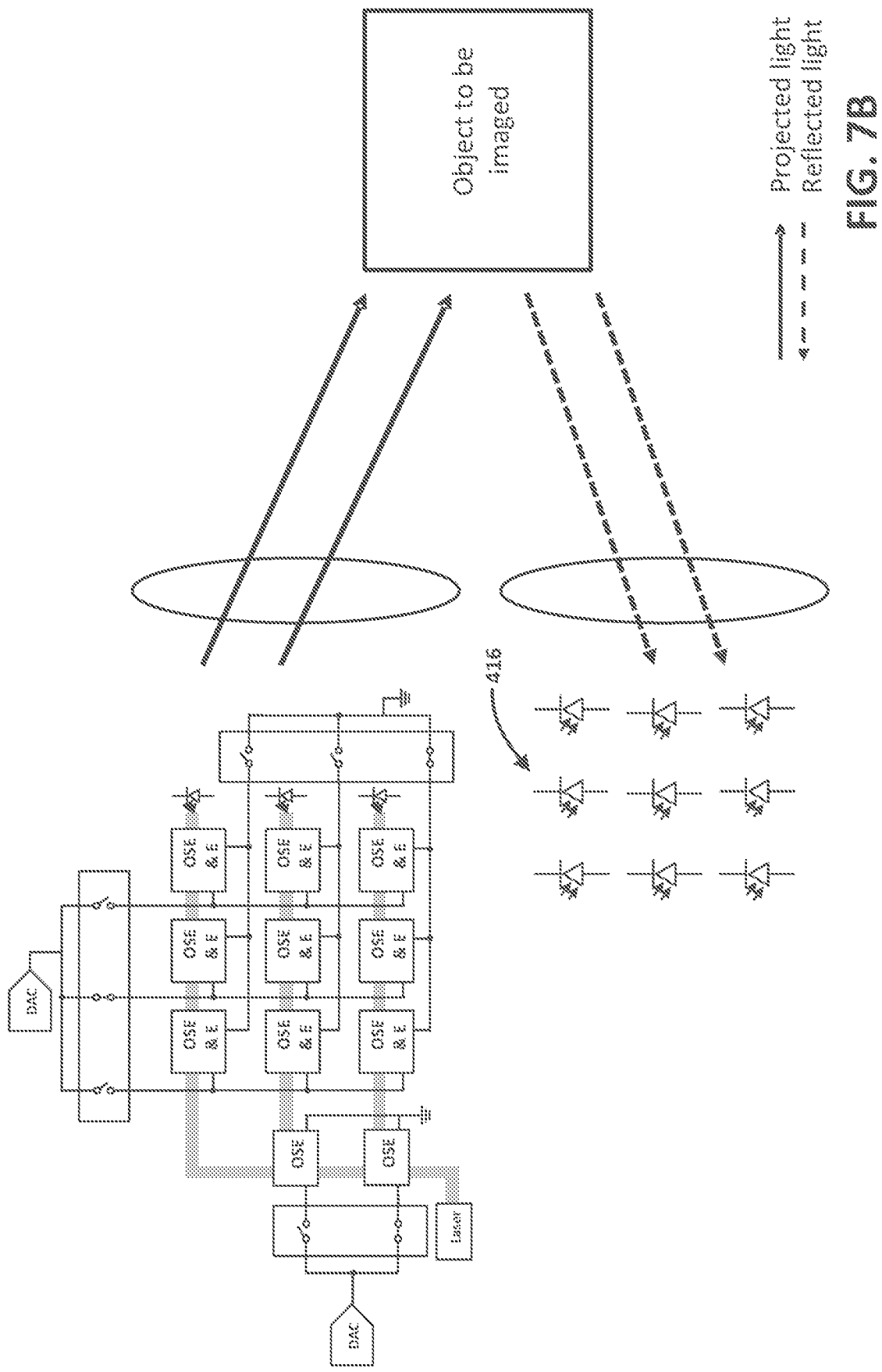

LOW-POWER INTEGRATED BEAM STEERING SWITCH MATRIX PLATFORM

CROSS-REFERENCE TO RELATED APPLICATIONS

This application claims the benefit of U.S. Provisional Patent Application No. 63/256,401 filed Oct. 15, 2021, which is hereby incorporated by reference in its entirety for any and all purposes.

BACKGROUND

Beam projection and receiving in the near-infrared wavelength has wide applications, including LiDAR, free-space communications, and remote sensing. Beam projection in the visible wavelength also has wide applications including laser scanning display, laser microscopy, biological sensing, optical trapping and ion trapping for quantum information processing. Many different methods and architectures using integrated photonics have been proposed to realize beam steering in a compact form factor. Existing methods, however, become power hungry when they are scaled-up to large-scale systems. Thus, there is a need for more sophisticated optical systems.

SUMMARY

Disclosed are methods, devices, and systems for optical emission and/or sensing. An example device may comprise a first waveguide extending in a first direction, a plurality of second waveguides optically coupled to the first waveguide and extending in a second direction different from the first direction, and a first plurality of optical elements optically configured to switch optical signals from the first waveguide to corresponding waveguides of the plurality of second waveguides. The device may comprise a second plurality of optical elements optically coupled to corresponding waveguides of the plurality of second waveguides and configured to switch optical signals traversing the corresponding waveguides to emitters configured to emit received optical signals. The device may comprise one or more control elements configured to control the first plurality of optical elements and the second plurality of optical elements thereby causing selection of an individual optical element of the second plurality of optical elements to separably control one or more of emission or sensing from the selected optical element.

An example method may comprise supplying an optical signal to a first waveguide extending in a first direction. The method may comprise supplying, based on controlling at least one of a first plurality of optical elements, the optical signal to at least one of a plurality of second waveguides extending in a second direction different from the first direction. The method may comprise supplying, based on controlling at least one of a second plurality of optical elements, the optical signal to at least one emitter. Each of the second plurality of optical elements may be separately selectable to control a corresponding emitter. The method may comprise causing, via the at least one emitter, emission of one or more optical signals.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

FIG. 7B shows an example of imaging with an emitter and a detector having different architectures.

DETAILED DESCRIPTION OF ILLUSTRATIVE EMBODIMENTS

Disclosed herein are methods, devices, and systems that can steer/scan/project and receive a beam in various wavelengths (e.g., in the near-infrared, the visible wavelength range). An example device may be integrated on a compact chip. The device may comprise no moving parts (e.g., no mechanical translation, no mirrors or other moving optical elements) with extremely low power consumption. For example, beam steering may be accomplished without any mechanical operations on the chip. The device may be based on and/or comprise an optical switch array. Though example materials are provided herein, the device is not limited to a specific type of material. The device may comprise materials, such as silicon, silicon nitride, lithium niobate, aluminum nitride, aluminum oxide, titanium dioxide, etc., and/or any combination thereof depending on the wavelength, speed of operation, and the specific application need. This device may be configured for straightforward feedback control and calibration. The device may have better robustness to environmental temperature change compared to existing platforms.

All of the previous demonstrated architectures either have power consumption of $n*P_\pi$, or $Log_2 n*P^\pi$, where n is the number of emitters in the systems. In contrast, the power consumption of the method disclosed here theoretically consumes only $2*P_\pi$ regardless of the size of the system. Therefore, this method consumes less power especially for a system with a large number of emitters.

The disclosed beam steering techniques may comprise compact and low-power beam steering, both in the visible and near-infrared spectral range, using compact emitters with an optical switch array. The optical switch array may comprise compact switches and very minimal control circuitry.

Figure 1A:
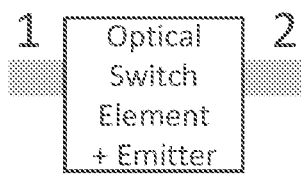
FIG. 1A shows an example optical element at a high level and comprising an optical switch and an emitter.
Figure 1B:
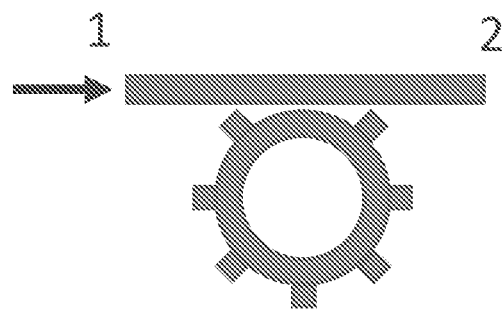
FIG. 1B shows an example switch and emitter.

FIGS. 1A-D show example components used in the disclosed devices. The components may comprise an optical switch element, an emitter (e.g., compact emitter), or a combination thereof. FIG. 1A shows at a high level an example optical switch element and an emitter. The optical switch element and emitter may be optically coupled to waveguide. An input portion of the waveguide is shown on the left and an output portion of the waveguide is shown on the right. FIG. 1B shows an example optical resonator (e.g., optical ring resonator, microring resonator) emitter. The optical resonator emitter may be configured as both an optical switch and an emitter. The optical resonator emitter may comprise an optical ring (e.g., or microring, ring resonator). The optical resonator emitter may comprise a plurality of gratings. The plurality of gratings may be on the outside of the optical ring disposed along at least a portion of a circumference of the ring. Though not shown, the optical resonator emitter may be coupled to an electrical supply line configured to supply an electrical signal. The electrical signal may be applied to this optical resonator emitter such that optical ring enters a resonance state. During the resonance state, light starts cycling inside the ring. The light may then be emitted out of the gratings.

Figure 1C:
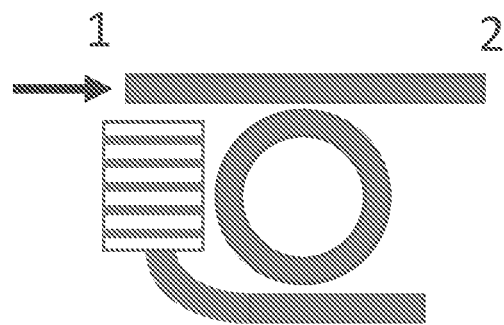
FIG. 1C shows another example switch and emitter.
Figure 1D:
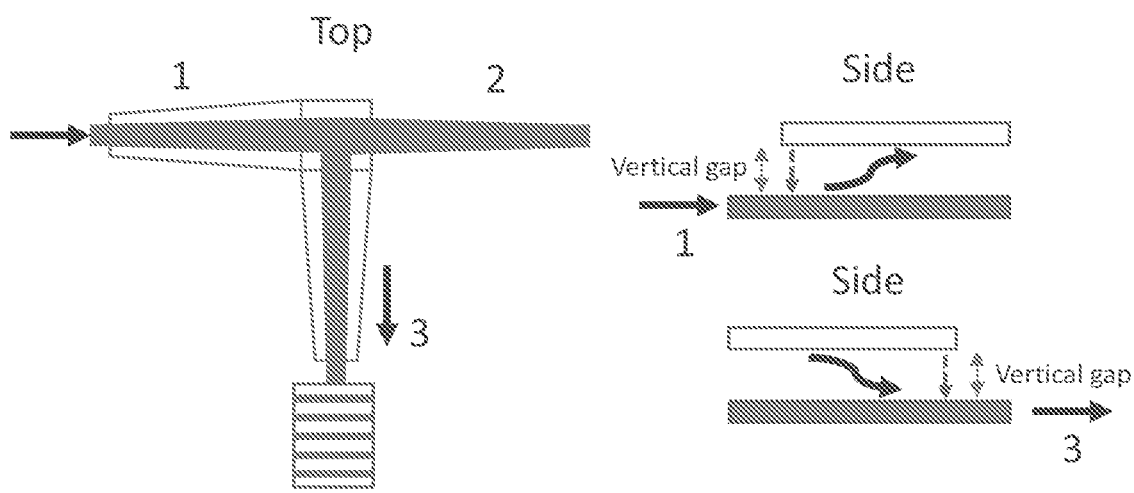
FIG. 1D shows another example switch and emitter comprising a micro-electromechanical system (MEMs) device.

FIG. 1C shows another example of a resonator and emitter. The resonator may be configured as an add-drop resonator. The resonator may comprise an optical ring resonator, such as a microring resonator. The resonator may be optically coupled to a first waveguide. A second waveguide may be optically coupled the microring on one end and optically coupled to an emitter on the other end. An electrical signal may be applied to the emitter causing light in the optical ring resonator to be supplied to the second waveguide, which may supply the light to the emitter thereby emitting the light. FIG. 1D shows another example optical switch element and emitter comprising a micro-electromechanical system (MEMs) device. The MEMs device may function in the same way as the MEMs device described below and shown in FIG. 2D.

Figure 2A:
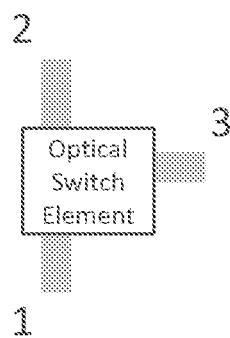
FIG. 2A shows an example optical switch element.

FIGS. 2A-E show example optical switch elements that may be used to implemented the disclosed techniques. FIG. 2A shows an example optical switch element at a high level. The optical switch may couple two waveguides. The first waveguide is shown in the vertical direction. A second waveguide is shown in the horizontal direction. The optical switch may be controlled to cause an optical signal traveling along the first waveguide (e.g., from 1 to 2), to switch to the second waveguide (e.g., from 1 to 3).

Figure 2B:
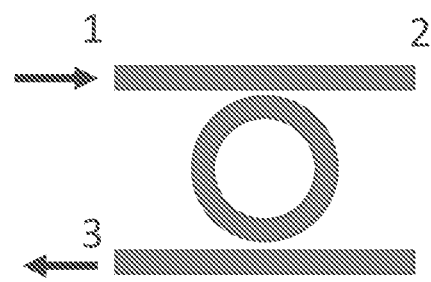
FIG. 2B shows an add-drop ring resonator which is an example of an optical switch.
Figure 2C:
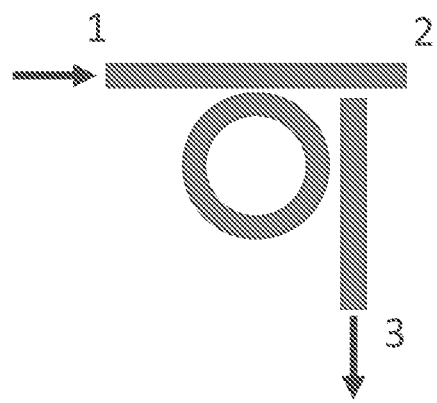
FIG. 2C shows another example of an add-drop ring resonator.

FIG. 2B shows an example optical switch comprising an add-drop microring resonator. As the electrical signal is applied to this add-drop microring resonator, the add-drop microring resonator is caused to enter a state of resonance. The add-drop resonator may comprise a first waveguide, shown above the resonator (e.g., and having port 1 and port 2), and a second waveguide, shown below the resonator (e.g., and having port 3). The resonator may be optically coupled to both the first waveguide and the second waveguide. Upon entering the state of resonance, light (e.g., from the first waveguide) may begin cycling inside the resonator. Then, the light may be supplied from the resonator to the second waveguide, resulting in light traveling out of port 3. FIG. 2C shows another example of an add-drop microring resonator. This add-drop may function in the same manner as the add-drop resonator of FIG. 2B, except the second waveguide may be oriented along a different direction (e.g., port 3 is now vertically disposed) than the first waveguide.

Figure 2D:
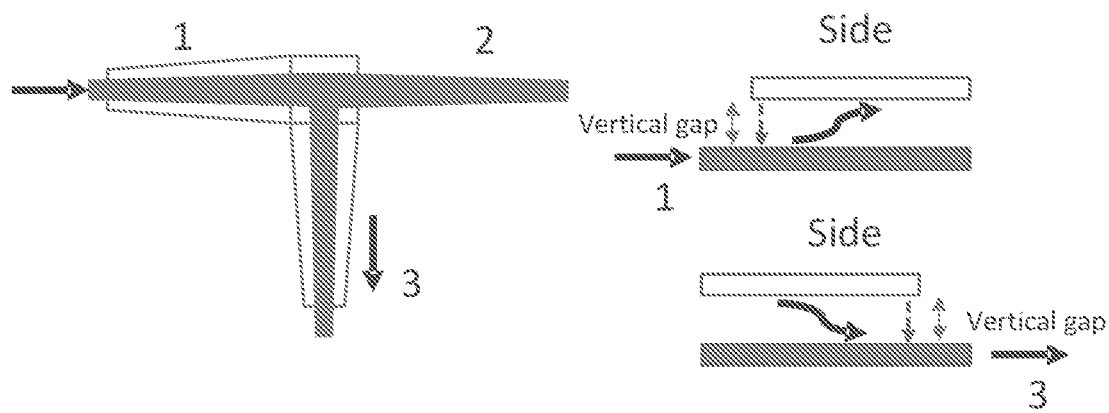
FIG. 2D shows another example of a switch element.

FIG. 2D shows another example of a switch element. The example switch element may comprise a micro-electromechanical system (MEMS). As an electrical signal is applied, a top waveguide (light colored rectangle) may be caused to move downward. The light may evanescently couple and propagate through the top waveguide at port 1. Then, the light may evanescently couple back to the bottom waveguide (dark colored rectangle) at port 3. The black curved arrow indicates the light path and the dotted arrow indicates the top waveguide coming down when an electric signal is applied.

Figure 2E:
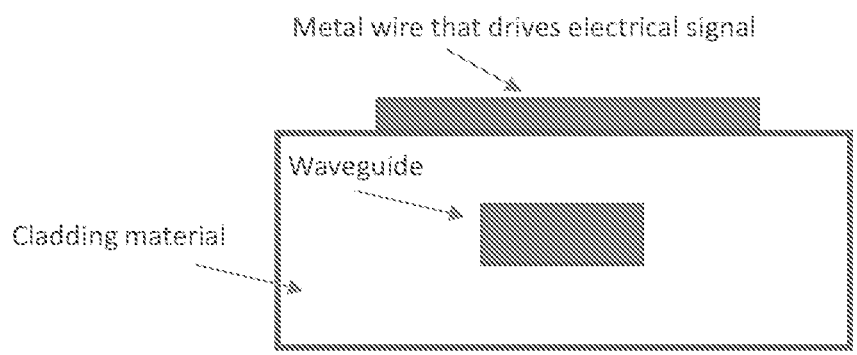
FIG. 2E shows an example of thermo-optic tuning of a waveguide.
Figure 2F:
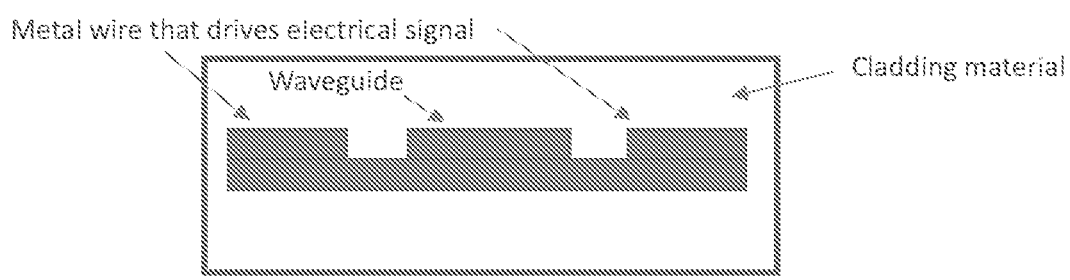
FIG. 2F shows an example of electro-optic tuning of a waveguide.

The waveguide platforms are not limited to thermo-optic effect. The disclosed can be with electro-optic effect or any other kind of effect with other materials. FIG. 2E shows an example of thermo-optic tuning of waveguide. Metal wire may be placed on top acting as a micro-heater. FIG. 2F shows an example of electro-optic tuning of waveguide. Metal wires may be placed on both sides of the waveguide to form E-field between each other.

Figure 3:
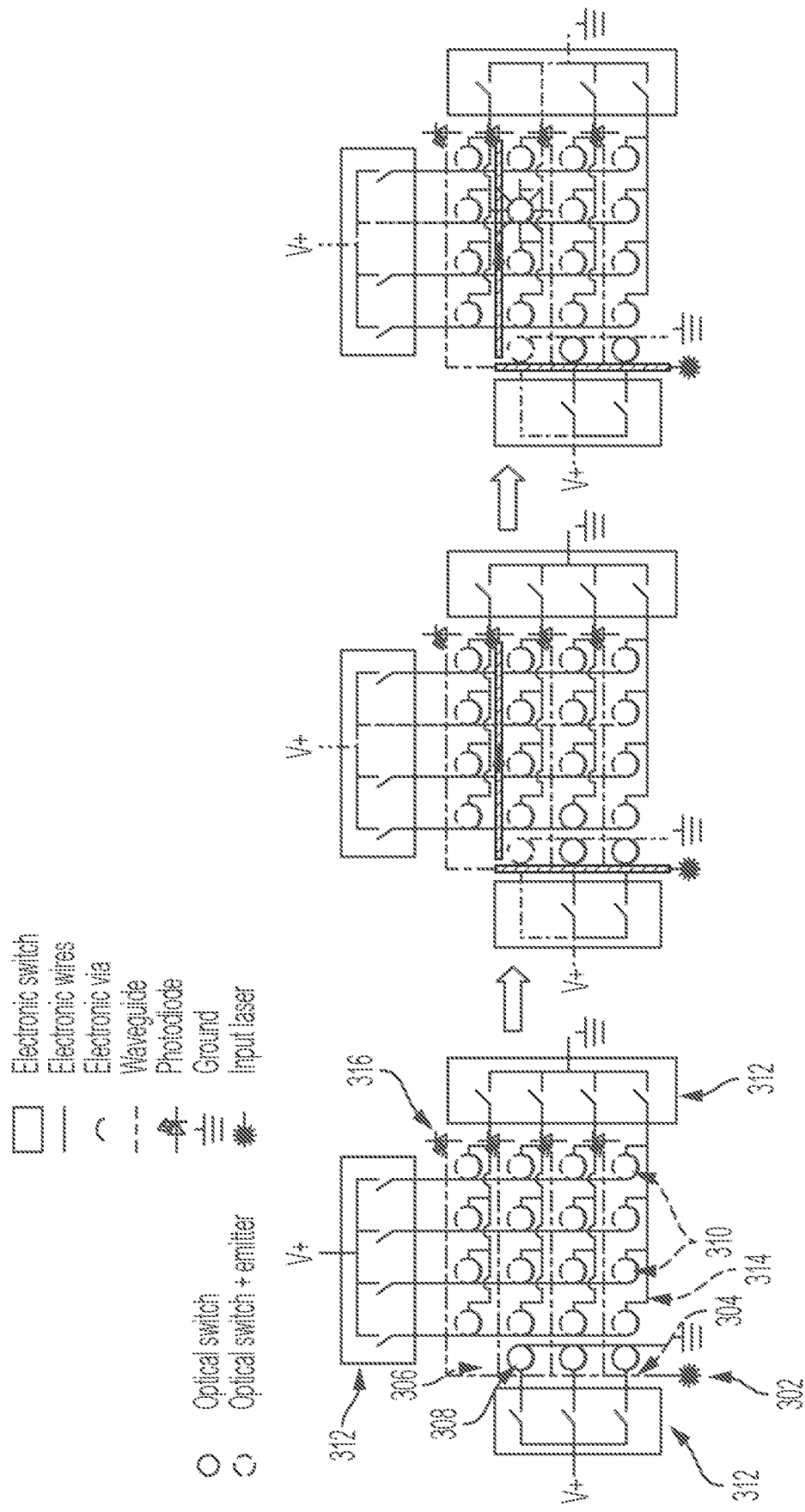
FIG. 3 shows an example proposed architecture.

FIG. 3 shows an example device in accordance with the present techniques. As explained in more detail further below, the device 300 may comprise an optical source 302, a first waveguide 304 (e.g., a vertical waveguide), a plurality of second waveguides 306 (e.g., horizontal waveguides), a first plurality of optical elements 308 (e.g., optical switches, at the junction of the first waveguide and corresponding waveguides of the plurality of second waveguides), a second plurality of optical elements 310 (e.g., optical switches and emitters, disposed along each of the second waveguides 306), one or more control elements 312 (e.g., electrical switches to tune the optical switches and emitters), wires 314 (e.g., electrical wires to supply electricity (e.g., or heat) from the one or more control elements to the optical switches and/or emitters), and one or more photodiodes 316 (e.g., at the end of one or more of the plurality of second waveguides.

The optical signal (e.g., light) may be emitted from the optical source 302 may propagate in the first waveguide 304 (e.g., a vertical bus waveguide). The optical signals may be coupled and/or supplied to one or more of the plurality of second waveguides 306 (e.g., horizontal waveguides) via the first plurality of optical elements 308 (e.g., one or more optical switches, as such as add-drop resonators).

An optical signal (e.g., light) may be supplied to the first waveguide 304. The first waveguide 304 may extend in and/or be oriented along a first direction (e.g., a vertical bus waveguide). The optical signal may be supplied to at least one of the plurality of second waveguides 306. The plurality of second waveguides 306 may extend in a second direction different from the first direction (e.g., horizontal bus waveguides). The optical signal may be supplied to the selected one of the plurality of second waveguides 306 based on controlling (e.g., biasing, sending an electrical signal to) at least one of the first plurality of optical elements 308. Each of the first plurality of optical elements may comprise an optical switch configured (e.g., when biased( ) to switch optical signals from first waveguide 304 to a corresponding one of the plurality of second waveguides 306.

The optical signal may be supplied to at least one emitter (e.g., of the second plurality of optical elements 310). The optical signal may be supplied to the at least one emitter based on controlling at least one of a second plurality of optical elements 310. Each of the second plurality of optical elements 310 may be separately selectable to control a corresponding emitter. Selection of individual optical elements of the second plurality of optical elements 310 may be used to perform beam steering of one or more beams formed based on the emitted optical signals. The selected waveguide of the plurality of second waveguides 306 may be optically coupled with and/or comprise a corresponding second plurality of optical elements 310 (e.g., resonators and emitters). One or more of second plurality of optical elements 310 of the selected waveguide may be biased into resonance to emit the optical signals.

Emission of one or more optical signals may be caused via the at least one emitter. One or more signals (e.g., reflected signals) may be caused to be received via the selected at the portion of the second plurality of optical elements. The one or more signals may be caused to be received based on selection of at least portion of the second plurality of optical elements.

The device may comprise several control element, such as the one or more control elements 312 shown in FIG. 3. With three control elements (e.g., electronic switches), the number of required electronic drivers decreases to two regardless of the array size. As shown in FIG. 3, the proposed beam steering platform may comprise a 2D array of pixels. The 2D array of pixels may be made of microring emitters and add-drop resonators that direct light across the array. However, the pixels are not limited to microring emitters. The optical switches are also not limited to add-drop microring resonators. It can be any compact emitter that has a switching capability. It can also be a combination of a compact emitter with a switch.

As a further explanation. Laser light may propagate into a bus waveguide and couple to one of the add-drop resonators (a switch) when an appropriate electrical control signal is applied and the optical resonance of the resonator is shifted to match the wavelength of the input laser (if it's a resonance-based switch. If it's not, the switch will route the signal to a different route as an appropriate electrical control signal is applied). By using the electrical switch on the left, it may be ensured that only one of the switches is biased so that switch turns on. Then, the optical signals may be routed to one of the compact emitters by another switch. This can be done by applying electrical signals to one of the switches that is connected to a compact emitter. An electrical control signal may be applied to only one of the switches by using an electronic switch on the top and on the right (to ground).

As a further illustration, the optical signal may be supplied to the second row from the bottom as the second switch on the left is closed thereby biasing the second optical switch element from the bottom. To emit the optical signal from the second column optical switch and emitter from the left on the second row from the bottom, the second switch from the left on the top and the second switch from the bottom on the right may be switched (e.g., to select and to ground the row. Then, the light gets emitted from the optical switch and emitter element.

The light emitted from the emitter is projected to the surroundings and the reflected light couples back to the emitter if used as an image sensor or projects into an eye if used as a projection display. Each pixel of the steerer can be optimized for both RGB (for projecting the image) and near-infrared (for scanning the environment). Unlike phased arrays which have the power consumption of $n \times P_\pi$ or MZI-based beam steerers which has the power consumption of $\log_2 n \times P_\pi$, the disclosed device will have the power consumption of $2 \times P_\pi$, no matter how large the system is. Also, considering the electronic power consumption, the disclosed device significantly improves over the state-of-the-art architectures by only requiring two electronic drivers and three simple electronic switches. This device can be extended into material platforms such as lithium niobate or aluminum nitride to demonstrate high-speed scanning in both near-infrared and visible wavelengths. The size of the platform may be extremely compact because it mainly comprises compact switches. The chip may be at least eight times smaller compared to the MZI-based beam steerer. Considering the size of electronics, the total optical-electronic system will be even smaller than other state-of-the-art platforms. The disclosed devices are superior by many orders of magnitude for SWaP-C (size, weight, power, and cost) compared to the state-of-the-art platforms demonstrated both in industry and academia.

Figure 4A:
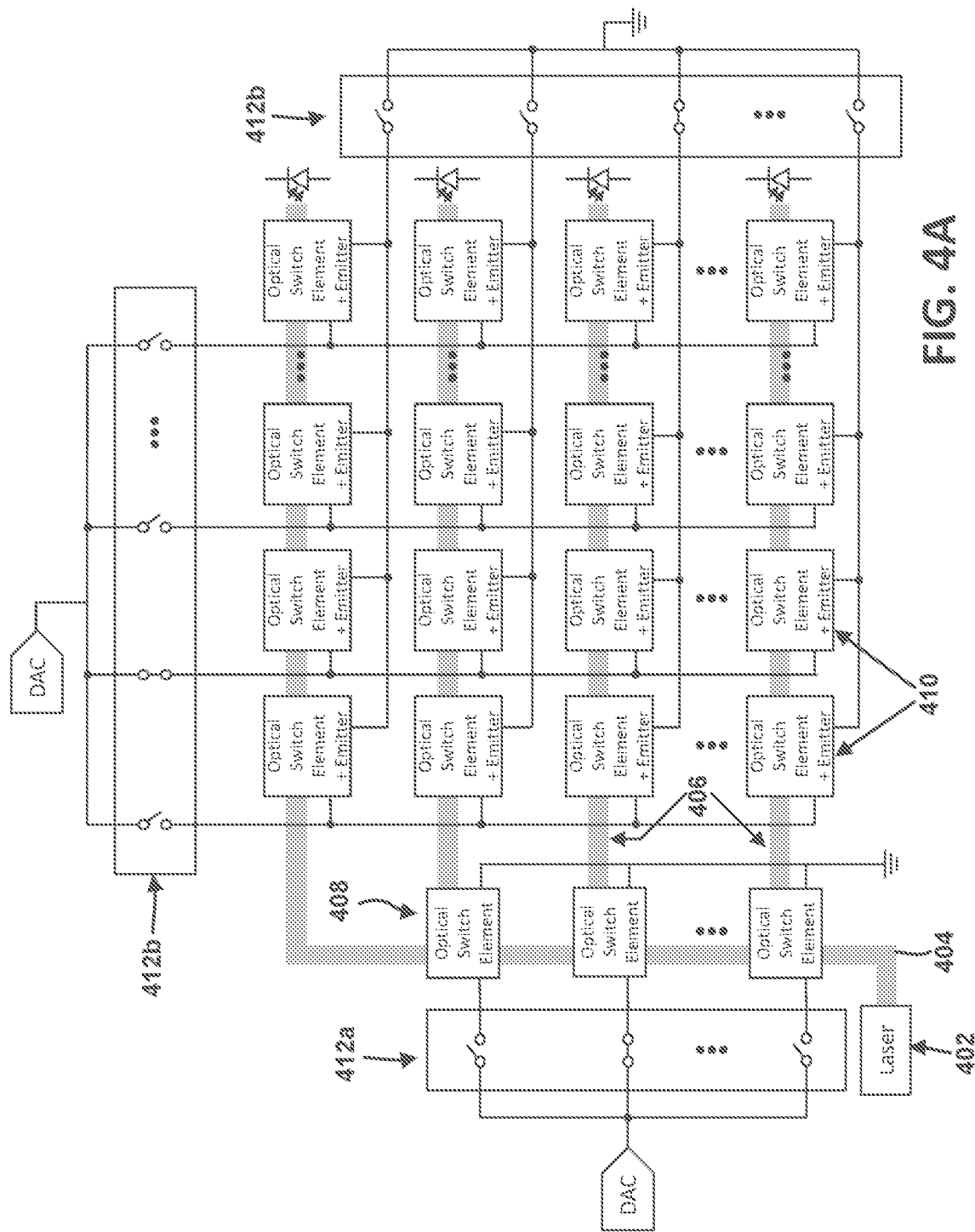
FIG. 4A shows an example device in accordance with the present disclosure.
Figure 4B:
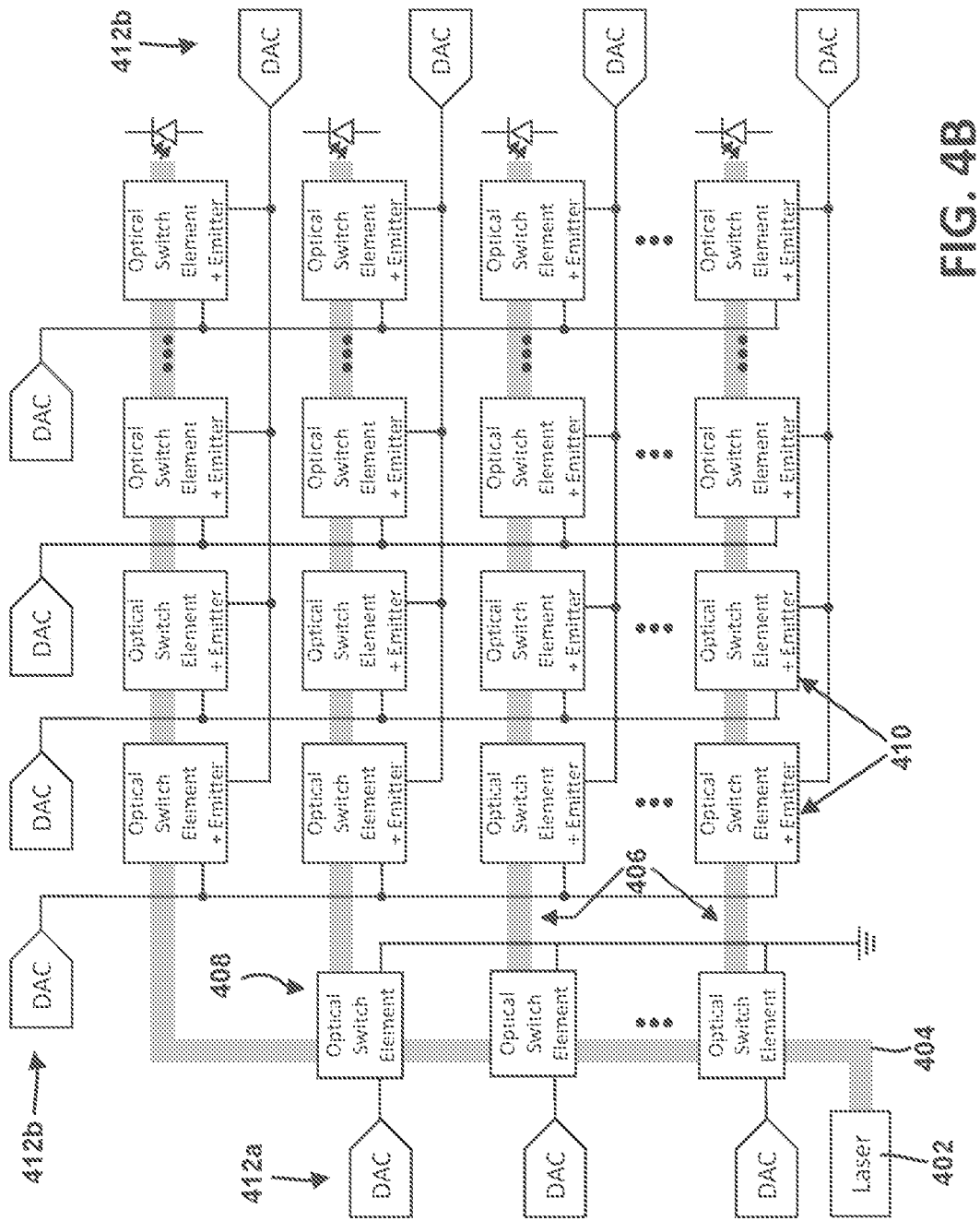
FIG. 4B shows another example device in accordance with the present disclosure comprising an alternative control configuration.

FIGS. 4A-B shows a general diagram of an example device. FIG. 4A shows an example device 400 in accordance with the present disclosure. Any of the components and/or features of FIGS. 4A-B may comprise any of the components and/or features disclosed elsewhere herein, such as the components and/or features of FIG. 3.

The device 400 may comprise an optical source 402 (e.g., laser or other optical source) configured to output optical signals (e.g., light). The optical source 402 may be configured to supply the optical signals to the first waveguide.

The device 400 may comprise a first waveguide 404. The first waveguide 404 may extend at least in part in a first direction (e.g., shown as the vertical direction, but any direction may be used). The device 400 may comprise a plurality of second waveguides 406. The plurality of second waveguides 406 may be optically coupled to the first waveguide 404. The plurality of second waveguides 406 may extend in a second direction different from the first direction. The first direction may be substantially orthogonal to the second direction.

The device 400 may comprise a first plurality of optical elements 408. The first plurality of optical elements 408 may be configured (e.g., optically and/or electrically configured) to switch optical signals from the first waveguide 404 to corresponding waveguides of the plurality of second waveguides 406. The first plurality of optical elements 408 may comprise a microring emitter, a microresonator emitter, a microresonator emitter having gratings on the circumference of the microresonator, a microresonator emitter coupled to an emitter, a micro-electromechanical systems optical switch, a phase change material optical routing switch, an optical routing switch, or any combination thereof. The first plurality of optical elements 408 may comprise one or more of an array of optical elements or a matrix of optical elements.

The device 400 may comprise a second plurality of optical elements 410. The second plurality of optical elements 410 may be individually controllable to steer optical signals (e.g., without mechanical elements). The second plurality of optical elements 410 may be optically coupled to corresponding waveguides of the plurality of second waveguides 406. The second plurality of optical elements 410 may be configured to switch optical signals traversing the corresponding waveguides to emitters configured to emit received optical signals. The second plurality of optical elements 410 may comprise a switch, an emitter, or a combination thereof. The second plurality of optical elements 410 may comprise an optical switch, an add-drop microresonator, a micro-electromechanical systems optical switch, a phase change material optical routing switch, or an optical routing switch, or any combination thereof. At least some of the emitters may be arranged in a two-dimensional grid pattern.

The device 400 may comprise one or more control elements 412. The one or more control elements 412 may be configured to control the first plurality of optical elements 408 and/or the second plurality of optical elements 410 thereby causing selection of an individual optical element of the second plurality of optical elements 410 to separably control one or more of emission or sensing from the selected optical element. The one or more control elements 412 may control beam steering of one or more beams formed based on the emitted optical signals.

The one or more control elements 412 may comprise a first plurality of control switches 412a. The first plurality of control switches 412a may be configured to control activation of corresponding optical elements of the first plurality of optical elements 408. The first plurality of control switches may be electrically controllable. The one or more control elements may comprise a second plurality of control switches 412b. The second plurality of control switches 412b may be configured to control activation of individual optical elements of the second plurality of optical elements 410. The second plurality of control switches 412a may be electrically controllable. The device 400 may comprise a computer processor (not shown) configured to control, based on computer readable instructions, the one or more control elements for one or more of optical emission, optical projection, or optical sensing. In some implementations, the first plurality of control switches 412a may be controlled by sending signals to a first digital-to-analog converter 413a. The second plurality of control switches 412a may be controlled by sending signals to a second digital-to-analog converter 413b.

Figure 7A:
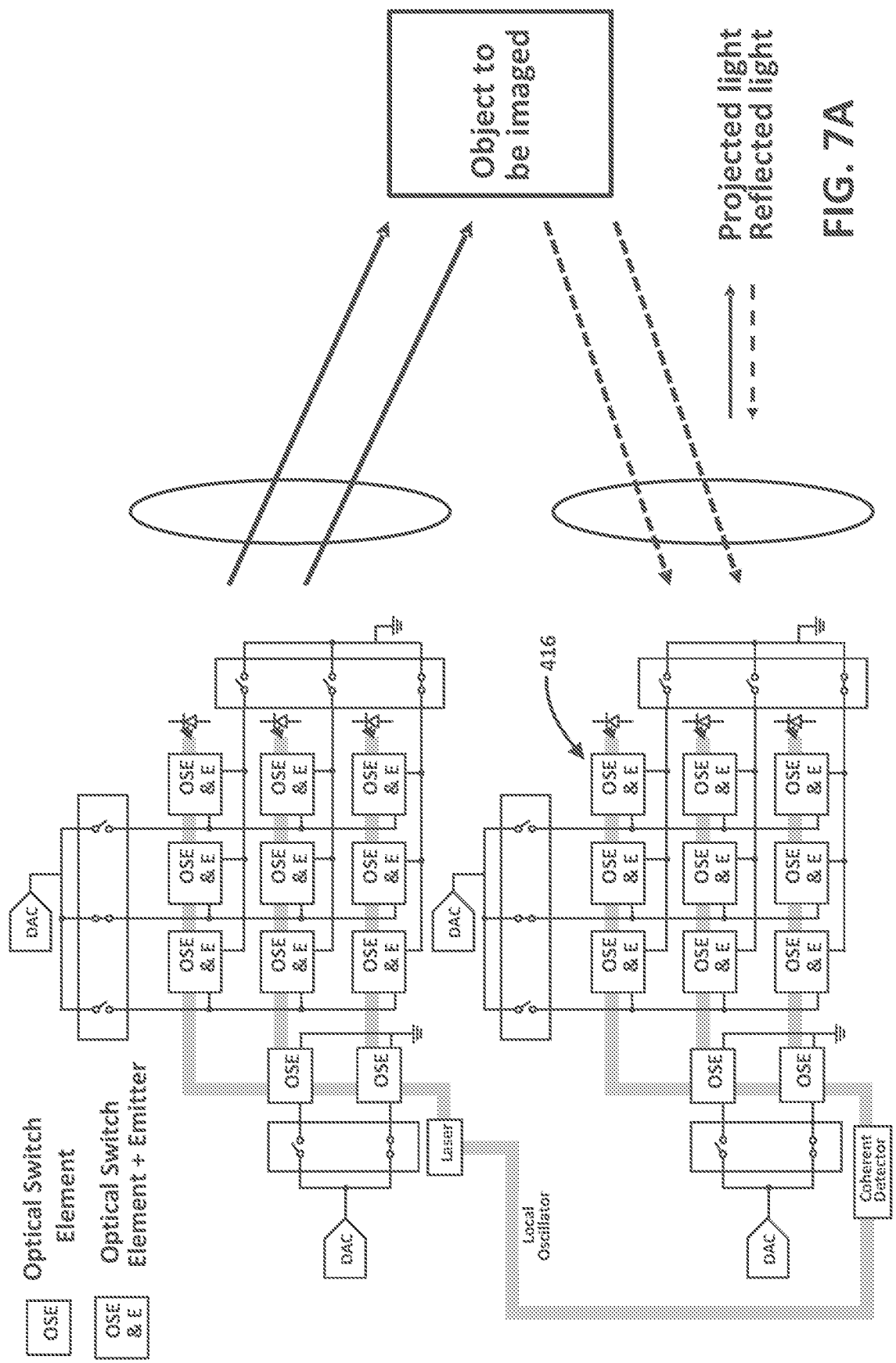
FIG. 7A shows an example of imaging with an emitter and a detector having similar architecture.

The device 400 may be implemented for detecting optical signals. Various implementations for detecting optical signals are discussed more below and shown in details in FIGS. 7A-D. The device 400 may comprise a detector 414. The second plurality of optical elements 410 may be configured to detect optical signals based on reflections of the emitted optical signals. The second plurality of optical elements 410 may be configured to supply, via corresponding waveguides of the plurality of second waveguides 406, the detected optical signals to the first waveguide 404. The first waveguide 404 may be at least part of an optical path that supplies the detected optical signals to the detector 414. In some scenarios, the second plurality of optical elements may be configured as detectors. In addition or in the alternative, the device 400 may comprise a plurality of detector elements separate from the second plurality of optical elements 410. The plurality of detector elements may be configured to detect optical signals based on reflections of the emitted optical signals. The device 400 may comprise a third plurality of optical elements 416, as shown in FIGS. 7A-B. The third plurality of optical elements 416 may be configured to detect optical signals based on reflections of the emitted optical signals. The third plurality of optical elements 416 may be configured to supply, via one or more waveguides, the detected optical signals to a detector. The third plurality of optical elements 416 may be the same as but separate from the second plurality of optical elements. The third plurality of optical elements 416 may comprise photodiodes.

FIG. 4B shows another example device in accordance with the present disclosure. The device of FIG. 4B may be the same as the device of FIG. 4A but the one or more control elements comprise a plurality of digital to analog converters (DACs) 415 instead of the switches shown in FIG. 4A. As an example, an optical signal may be switched to the second row by sending a signal to the second DAC on the left to biases the second optical switch element from the bottom. To select the second column optical switch and emitter from the left on the second row from the bottom, a signal may be supplied to second DAC from the left on the top row of DACs and send a signal to second DAC from the bottom on the right section of DACS to switch to zero volt/ground. Then, the optical signal may be emitted from the optical switch and emitter element.

The devices disclosed herein may comprise one or more lenses. The one or more lenses may be disposed adjacent the second plurality of optical elements 410. The one or more lenses may be configured to direct the one or more emitted signals. The one or more lenses may comprise a single lens for all of the second plurality of optical elements, a metasurface lens, a plurality of microlenses, or any combination thereof.

Figure 5A:
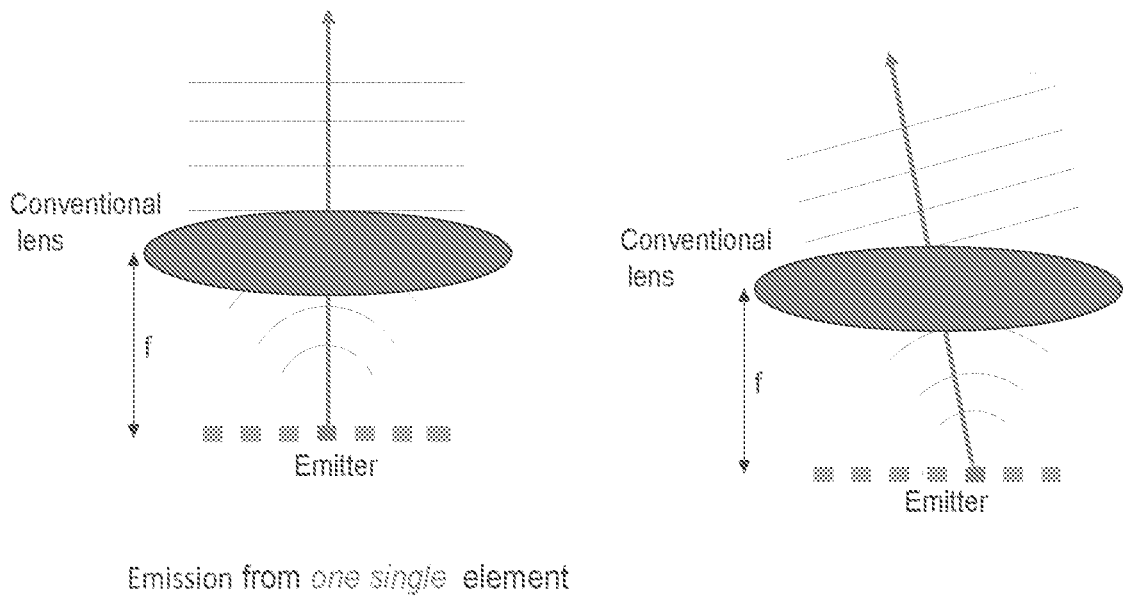
FIG. 5A shows a conventional lens on top of emitters.
Figure 5B:
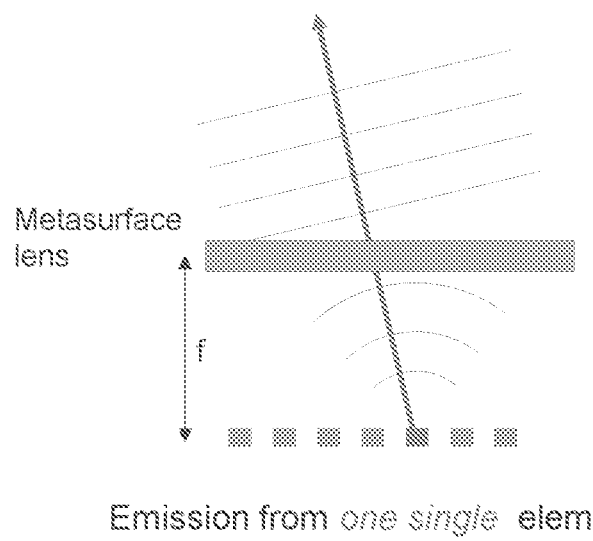
FIG. 5B shows a metasurface lens on top of emitters.
Figure 5C:
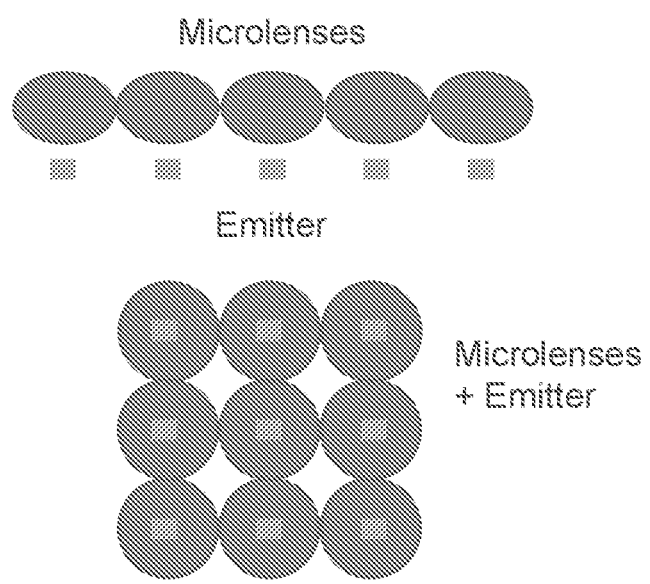
FIG. 5C shows example microlenses fabricated on top of emitters.

FIGS. 5A-C shows example devices (e.g., or a platform) comprising one or more lenses on top of an emitter. FIG. 5A shows a conventional lens on top of emitters. FIG. 5B shows a metasurface lens on top of emitters. FIG. 5C shows an example microlenses fabricated on top of emitters. An example lens may be placed at a distance f from the emitters, where f is the focal length of the lens. Light emitted from the single emitter is then collected by the lens to form a collimated beam. By applying different electrical signals to the optical switch array and the switch before the emitters, one can switch light between different emitters and thus change the light emitting position. The lens may perform a spatial Fourier transform to the emitted light. Therefore, light emitted from a different position forms a collimated beam pointing in a different direction and/or angle. As a result, a steerable beam may be formed. The direction of the steerable beam may be controlled by the electrical signals applied to the optical switch array. The same device described here may also perform beam receiving. This is because the reciprocity of light, a device that forms a beam at the output can also receive a light beam if this light beam is sent to the device in the reversed direction.

To achieve a large steering angle, the lens may have a high numerical aperture and good correction of off-axis aberration. This can be done very compactly with a metasurface lenses or compound lenses fabricated with two-photon direct writing. In particular, metasurface lenses (or called metalens in some literatures), which may comprise many subwavelength resonators, have been shown to meet these requirements (e.g., as shown FIG. 5B). Conventional lenses, as shown in FIG. 5A, may be used based on machining and/or molding (e.g., if the compactness of the beam-steering and receiving device is not a concern). Microlenses may be fabricated for each emitter on top, as shown in FIG. 5C. It should also be noted that FIGS. 5A-B show emission from different positions in the array/matrix of optical elements. This results in the emitted light being transformed to different angular positions as demonstrated by the comparison of these figures.

Another advantage of the disclose techniques is the ability to perform straightforward feedback control, which enables robustness under the variations of environmental conditions. When the environmental conditions (especially the temperature) change, the refractive index of the waveguides may become different due to the thermo-optic effect. The electrical signals may need to be adjusted (e.g., reoptimized) for steering the beam to a particular direction. As shown by FIGS. 3 and 4A-4B, photodetectors may be located at the end of each waveguide. By adjusting the electrical signals to the optical switches such that the power to a specific detector is maximized, we can make sure that the light is passing through in one specific row. Then, we adjust the electrical signals to the optical switches that are before the compact emitters so that the power to a specific detector is minimized. We then make sure that light is being emitted from the specific emitter we want and can accommodate the environmental temperature change in real time. The photodetectors can be replaced with couplers such as, edge couplers or grating couplers and coupled to external photodiodes. The disclosed techniques are more robust than the conventional method because the beam direction is based on digital control.

Figure 6A:
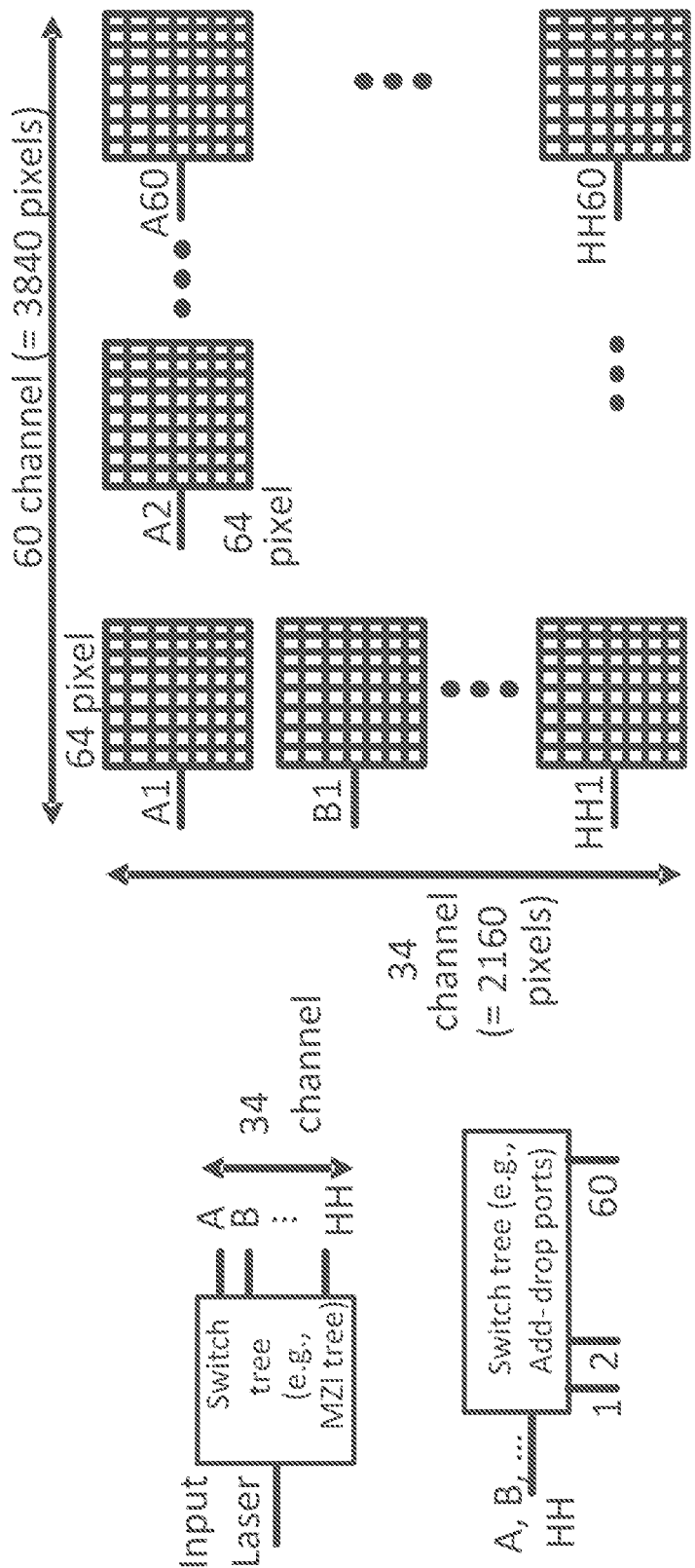
FIG. 6A an example device with a Mach-Zehnder interferometer (MZI) tree.

This architecture can be extended to visible wavelengths in very large-scale. This platform can be combined with a switch tree (e.g., MZI network) to mitigate the cascaded insertion losses of switches. FIG. 6A shows an example device comprising a Mach-Zehnder interferometer (MZI) tree. An input laser is distributed to one of the 34 channels (e.g., A,B, . . . AA, . . . HH). Then, the distributed light couples to one of the add-drop ports (e.g., add-drop microrings, add-drop optical switches) from 1 to 60. The coupled light goes to one of the tiles of the architecture in FIG. 3. This architecture can decrease the loss further down since it has less insertion loss from cascaded microrings (e.g., or cascaded optical switches).

Figure 6B:
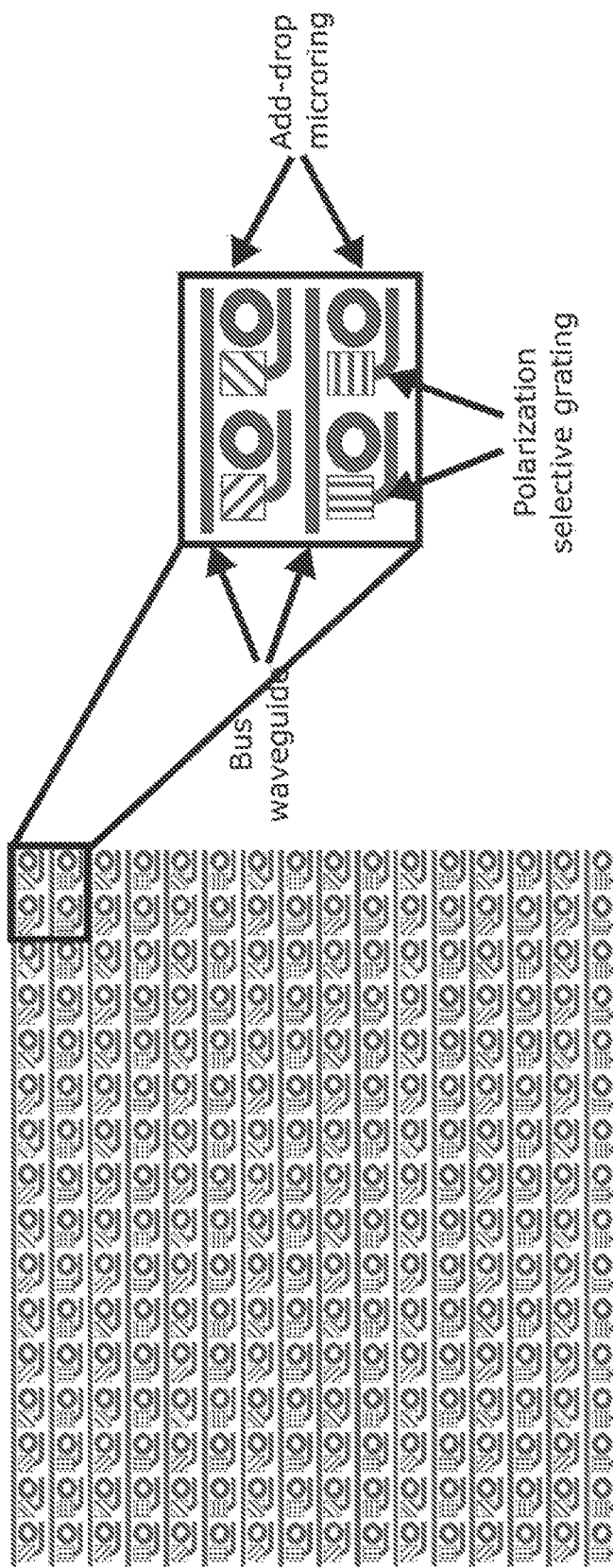
FIG. 6B shows an example grid of add-drop resonators.

FIG. 6B shows an example implementation of add-drop resonators. Each pixel of microring emitters can be replaced with an add-drop resonator and a polarization-selective grating. Coherent polarimetric imaging may be achieved with very high accuracy and precision by having differently polarized gratings (e.g., because the disclosed techniques may be laser-based). As shown in FIG. 6B, each set of 64 of a 64×64 array may be tiled in both x- and y-axis to form a 4K display (e.g., 3840×2160 pixels). A 6-stage switch tree (e.g., MZI network) may be used to route light to each of these sets. This combination of the switch tree (e.g., MZI network) and add-drop resonators can mitigate the insertion losses by a significant amount which can be the primary source of loss in the visible wavelengths. Additionally, the disclosed architecture may be extended in near-infrared for more functionalities such as polarimetric imaging. The emitters may be designed with a specific polarization, allowing for the development of a laser-based polarimetric imager with extremely high precision and accuracy by tiling this pixel with different polarization (e.g., as shown in FIG. 6B).

Figure 7C:
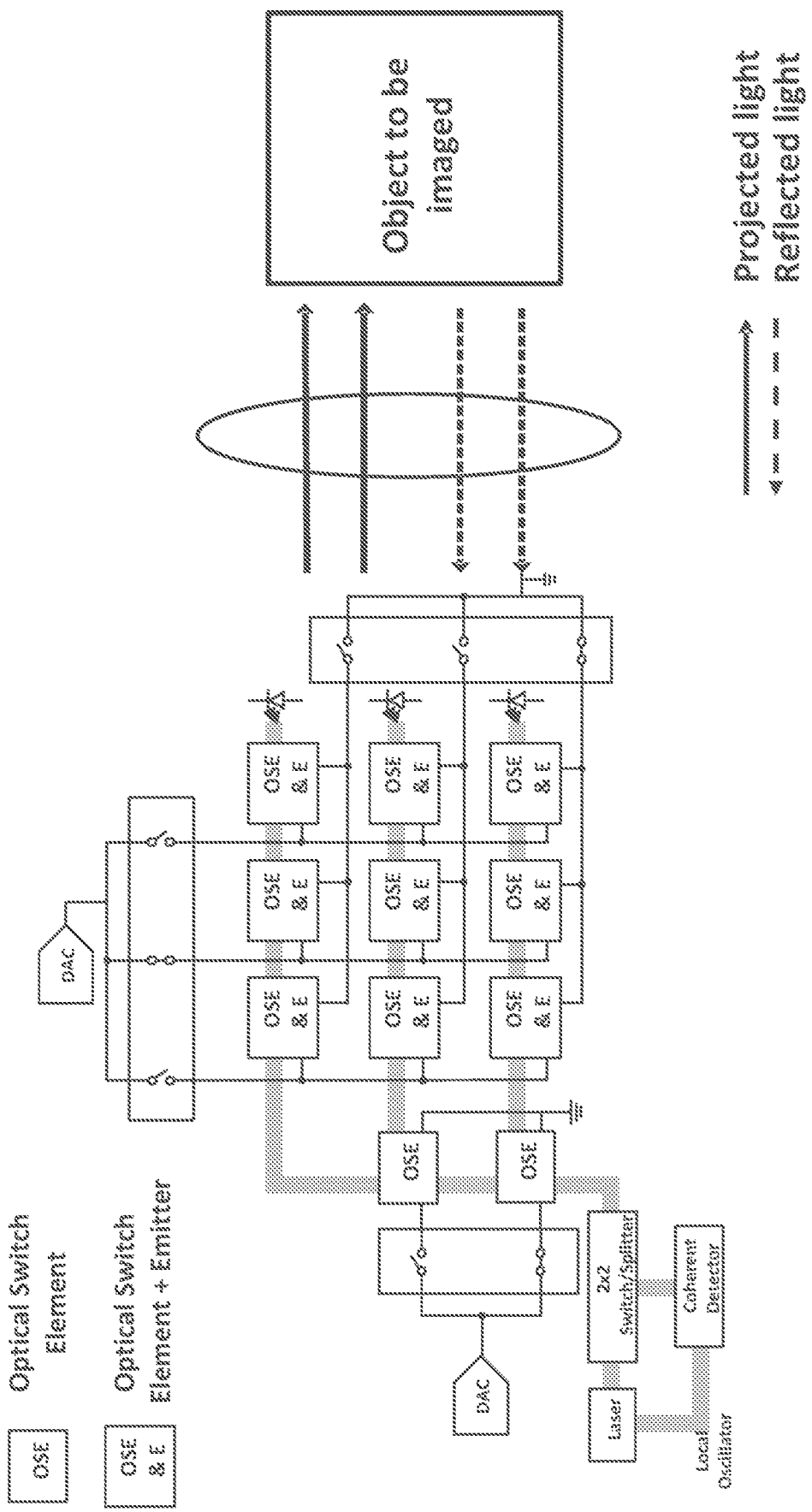
FIG. 7C shows an example of imaging with a single chip used for emission and detection.
Figure 7D:
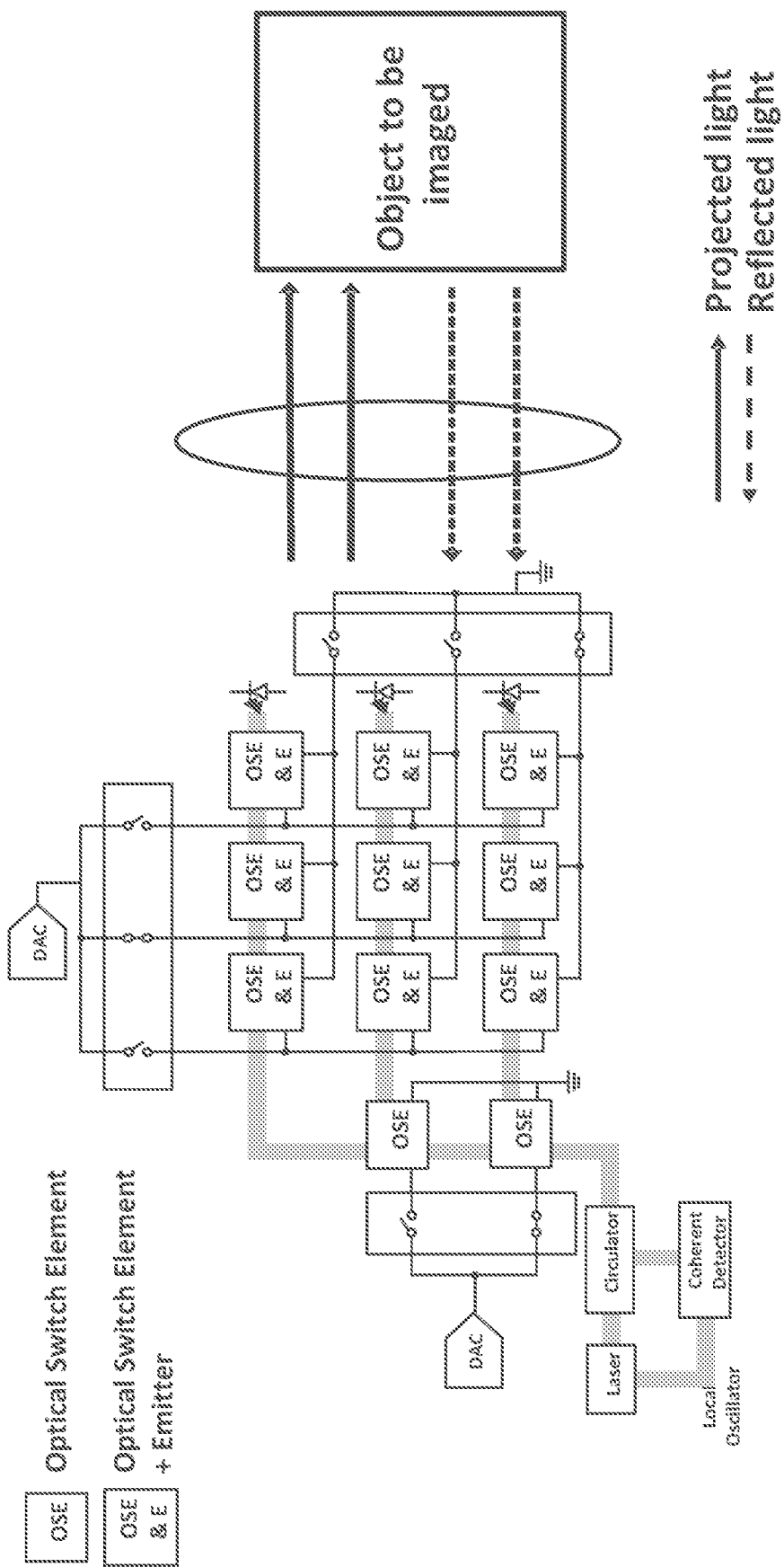
FIG. 7D shows another example of imaging with a single chip used for emission and detection.
Figure 8:
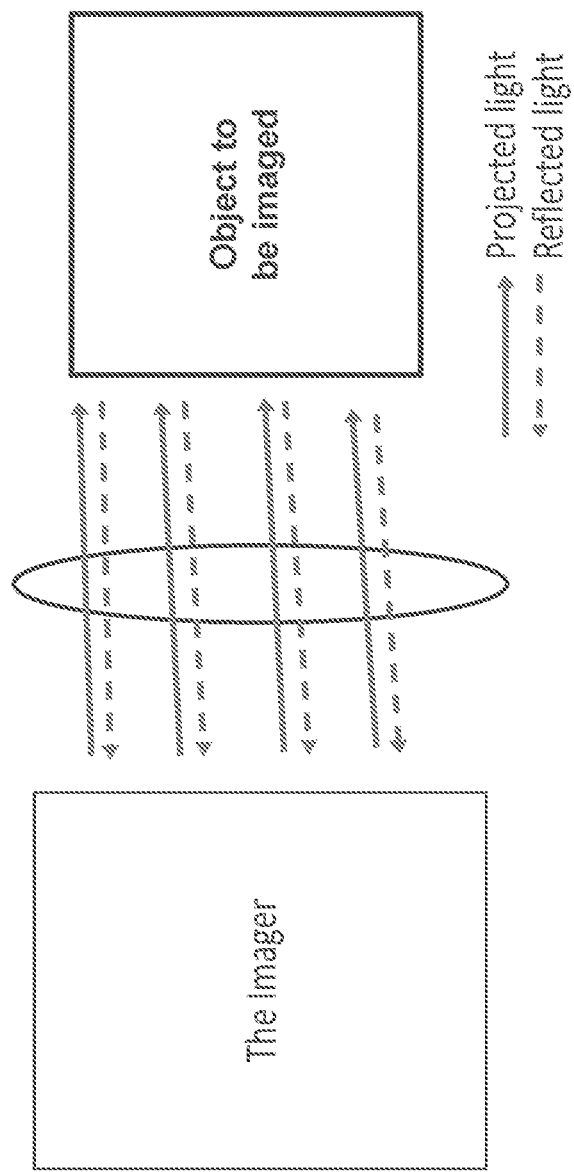
FIG. 8 shows the use of different imaging modalities.

The disclosed devices may also be used for LiDAR for mapping the surroundings with point cloud, free-space optical communications, biological sensing, neuron excitation, optical trapping, and ion trapping for ion-trapping based quantum computers. If the device is used as a LiDAR, it can be used for many different imaging modalities such as, FMCW, ToF, and AMCW (as shown in FIG. 8). If the device is used as an FMCW or AMCW, it can be used with the configuration in FIGS. 7A, FIG. 7C, and FIG. 7D. FIG. 7A shows an example of imaging with an emitter and a detector having similar architecture. FIG. 7B shows an example of imaging with an emitter and a detector having different architectures. FIG. 7C shows an example of imaging with a single chip used for emission and detection. FIG. 7D shows another example of imaging with a single chip used for emission and detection.

The light can be received from an identical copy of the chip (e.g., as shown in FIG. 7A) or it can be received using the same chip (e.g., as shown in FIG. 7C-D) using a 2×2 switch or an isolator to isolate the received signal form the transmitting signal. A local oscillator may be used to beat the received signal in this case. If ToF imaging is used, it can be implemented using the configuration shown in one or more of FIGS. 7A-D. The light can be received using an identical copy of the chip or can be received with photodiode array to measure the time spectrum of the broadened signal. It should be noted that the local oscillator and coherent detector shown in any of FIG. 7A-D may not be required in all implementations. A detector in Time of Flight (ToF) operation may be used without the local oscillator and/or coherent detector.

The disclosed device may be used to implement computational imaging and compressive sensing. Single pixel imaging systems and lensless imaging systems use structured illumination and a single pixel photodiode or a CCD to capture a 3D/2D image reducing the complexity of the detection scheme. Typically, a DMD or SLM is used to create the structured or patterned light in 2 or 3 dimensions. Compressive sensing techniques require a specific set of light pattern generation that are sparse, and this can be done using the proposed device.

Figures 9A, 9B:
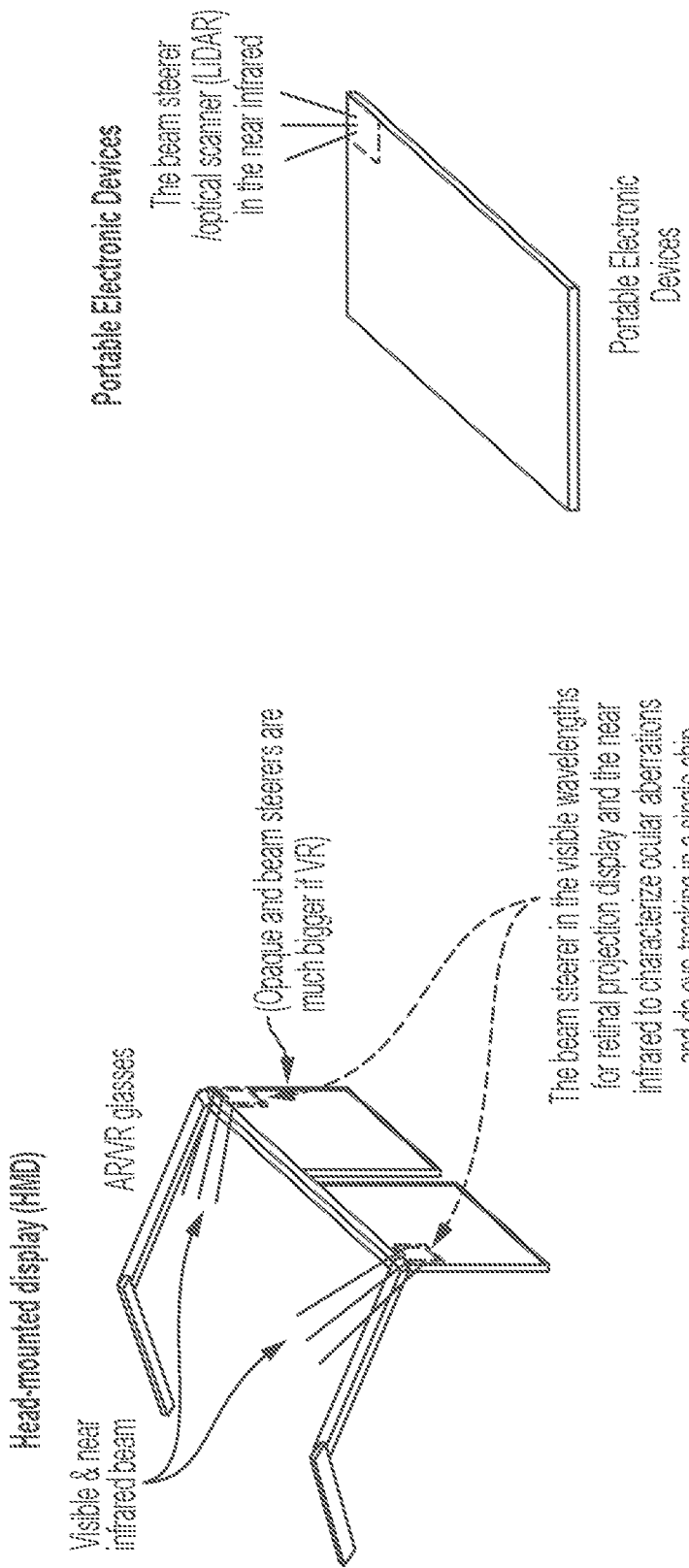
FIG. 9A shows an example a mounted head display.
FIG. 9B shows an example portable electronic device.

FIG. 9A shows an example head mounted display, such as an augmented display, virtual reality display, and/or the like. Augmented and virtual reality displays require light configuration directed at the retina that can be embedded on a head-mounted device. The proposed device allows for image projection and account for retinal mapping and adjustment. This same configuration can incorporate foveated imaging which requires different density of optical patterns across the image formed to better match our vision.

The head mounted display may comprise any of the devices disclosed herein, such as by integrating the device into a glasses frame, and/or the like. The disclosed device may be used to characterize ocular aberrations by projecting optical signals (e.g., a NIR spot) into the retina, raster scanning it, and detecting backscattered optical signals as shown in FIG. 9A. The device may detect optical signals backscattered from the retina that contains information about ocular aberrations. The device may be configured to perform eye-tracking. The device integrated into the display may project images to the eyes. The device disclosed herein may be used for both AR/VR displays. Each pixel of the device may be configured to radiate beams of the red, green, blue light. The device may project optical signals into the eye and detects backscattered optical signals (e.g., RGB light, near-infrared light) from the retina. The disclosed device may be based on material that is transparent in both visible and near-infrared wavelengths such as, silicon nitride with simple electronic circuit architecture that resembles the control circuitry of LEDs.

FIG. 9B shows an example portable electronic device. The portable electronic device may comprise a LiDAR scanner on a portable device. The LiDAR scanner may be implemented using the devices and techniques disclosed herein. The device can be used to scan the surroundings to create point cloud maps. This type of device can be embedded within handheld electronics and other consumer electronics as a LiDAR scanner. Similarly, this type of device could be embedded on endoscopy devices to medical procedures and diagnostics.

Figure 9C:
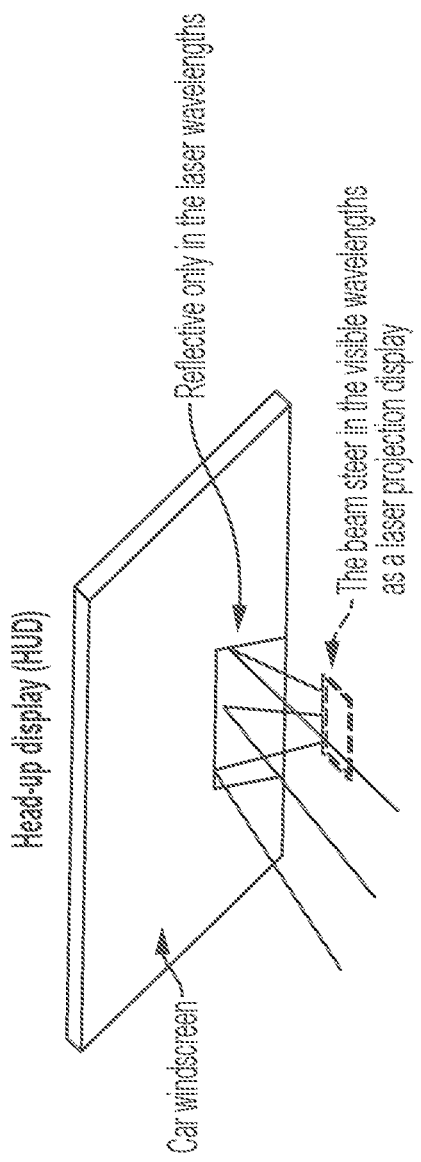
FIG. 9C shows an example heads up display.

FIG. 9C shows an example heads up display. The heads up display may be projected onto any surface, such as a car windscreen. The surface may be transparent but reflective only the wavelengths used by an example device using the techniques of the present disclosure. The disclosed device may be integrated into a dashboard, or other device, and project optical signals to the surface, which may be reflected to a user.

Different fabrication techniques may be used to fabricate the devices disclosed herein. The waveguides disclosed herein may comprise silicon nitride but are not limited to silicon nitride. This includes any material transparent in the visible wavelength regime. The switches are not limited to thermo-optic tuning. This includes any method to change the refractive index of light on an integrated chip or even MEMS. The dimensions and arrangement of the waveguides, gratings, phase shifters and chip configuration can be different in order to optimize power consumption, signal to noise ratio of the beam, etc.

The disclosure many include any combination of at least the following aspects.

Aspect 1. A device comprising, consisting of, or consisting essentially of: a first waveguide extending at least in part in a first direction; a plurality of second waveguides optically coupled to the first waveguide and extending in a second direction different from the first direction; a first plurality of optical elements optically configured to switch optical signals from the first waveguide to corresponding waveguides of the plurality of second waveguides; a second plurality of optical elements optically coupled to corresponding waveguides of the plurality of second waveguides and configured to switch optical signals traversing the corresponding waveguides to emitters configured to emit received optical signals; and one or more control elements configured to control the first plurality of optical elements and the second plurality of optical elements thereby causing selection of an individual optical element of the second plurality of optical elements to separably control one or more of emission or sensing from the selected optical element.

Aspect 2. The device of Aspect 1, wherein the one or more control elements control beam steering of one or more beams formed based on the emitted optical signals.

Aspect 3. The device of any one of Aspects 1-2, wherein the first plurality of optical elements comprises one or more of an array of optical elements or a matrix of optical elements.

Aspect 4. The device of any one of Aspects 1-3, wherein at least some of the emitters are arranged in a two-dimensional grid pattern.

Aspect 5. The device of any one of Aspects 1-4, wherein the first plurality of optical elements comprises a microring emitter, a microresonator emitter, a microresonator emitter having gratings on the circumference of the microresonator, a microresonator emitter coupled to an emitter, a microelectromechanical systems optical switch, a phase change material optical routing switch, or an optical routing switch.

Aspect 6. The device of any one of Aspects 1-5, wherein second plurality of optical elements comprises one or more of an optical switch, an add-drop microresonator, a microelectromechanical systems optical switch, a phase change material optical routing switch, or an optical routing switch.

Aspect 7. The device of any one of Aspects 1-6, further comprising one or more lenses disposed adjacent the second plurality of optical elements and configured to direct the one or more emitted signals.

Aspect 8. The device of Aspect 7, wherein the one or more lenses comprises one or more of a single lens for all of the second plurality of optical elements, a metasurface lens, or a plurality of microlenses.

Aspect 9. The device of any one of Aspects 1-8, further comprising an optical source configured to supply the optical signals to the first waveguide.

Aspect 10. The device of any one of Aspects 1-9, further comprising a detector, wherein the second plurality of optical elements are configured to detect optical signals based on reflections of the emitted optical signals and supply, via corresponding waveguides of the plurality of second waveguides, the detected optical signals to the first waveguide, wherein the first waveguide is at least part of an optical path that supplies the detected optical signals to the detector.

Aspect 11. The device of any one of Aspects 1-10, further comprising a plurality of detector elements separate from the second plurality of optical elements, the second plurality of detector elements being configured to detect optical signals based on reflections of the emitted optical signals.

Aspect 12. The device of any one of Aspects 1-11, further comprising a third plurality of optical elements configured to detect optical signals based on reflections of the emitted optical signals and supply, via one or more waveguides, the detected optical signals to a detector.

Aspect 13. The device of any one of Aspects 1-12, wherein the one or more control elements comprise a first plurality of control switches configured to control activation of corresponding optical elements of the first plurality of optical elements.

Aspect 14. The device of Aspect 14, wherein the first plurality of control switches are electrically controllable.

Aspect 15. The device of any one of Aspects 1-14, wherein the one or more control elements comprise a second plurality of control switches configured to control activation of individual optical elements of the second plurality of optical elements.

Aspect 16. The device of Aspect 15, wherein the second plurality of control switches are electrically controllable.

Aspect 17. The device of any one of Aspects 1-16, wherein the second plurality of optical elements are individually controllable to steer optical signals without mechanical elements.

Aspect 18. The device of any one of Aspects 1-17, wherein the first direction is substantially orthogonal to the second direction.

Aspect 19. The device of any one of Aspects 1-18, further comprising a computer processor configured to control, based on computer readable instructions, the one or more control elements for one or more of optical emission, optical projection, or optical sensing.

Aspect 20. A method comprising, consisting of, or consisting essentially of:

supplying an optical signal to a first waveguide extending in a first direction; supplying, based on controlling at least one of a first plurality of optical elements, the optical signal to at least one of a plurality of second waveguides extending in a second direction different from the first direction; supplying, based on controlling at least one of a second plurality of optical elements, the optical signal to at least one emitter, wherein each of the second plurality of optical elements is separately selectable to control a corresponding emitter; and causing, via the at least one emitter, emission of one or more optical signals.

Aspect 21. The method of Aspect 20, wherein selection of individual optical elements of the plurality of optical elements is used to perform beam steering of one or more beams formed based on the emitted optical signals.

Aspect 22. The method of any one of Aspects 20-21, further comprising causing, based on selection of at least portion of the second plurality of optical elements, one or more signals to be received via the selected at the portion of the second plurality of optical elements.

Aspect 23. The method of any one of Aspects 20-22, wherein the optical signal comprises one or more of a coherent optical signal or a laser signal.

Aspect 23. A non-transitory computer-readable medium comprising computer-executable instructions that, when executed by one or more processors, cause a device to perform the method of any one of Aspects 20-23 and/or control the device of any one of Aspects 1-19.

Figure 10:
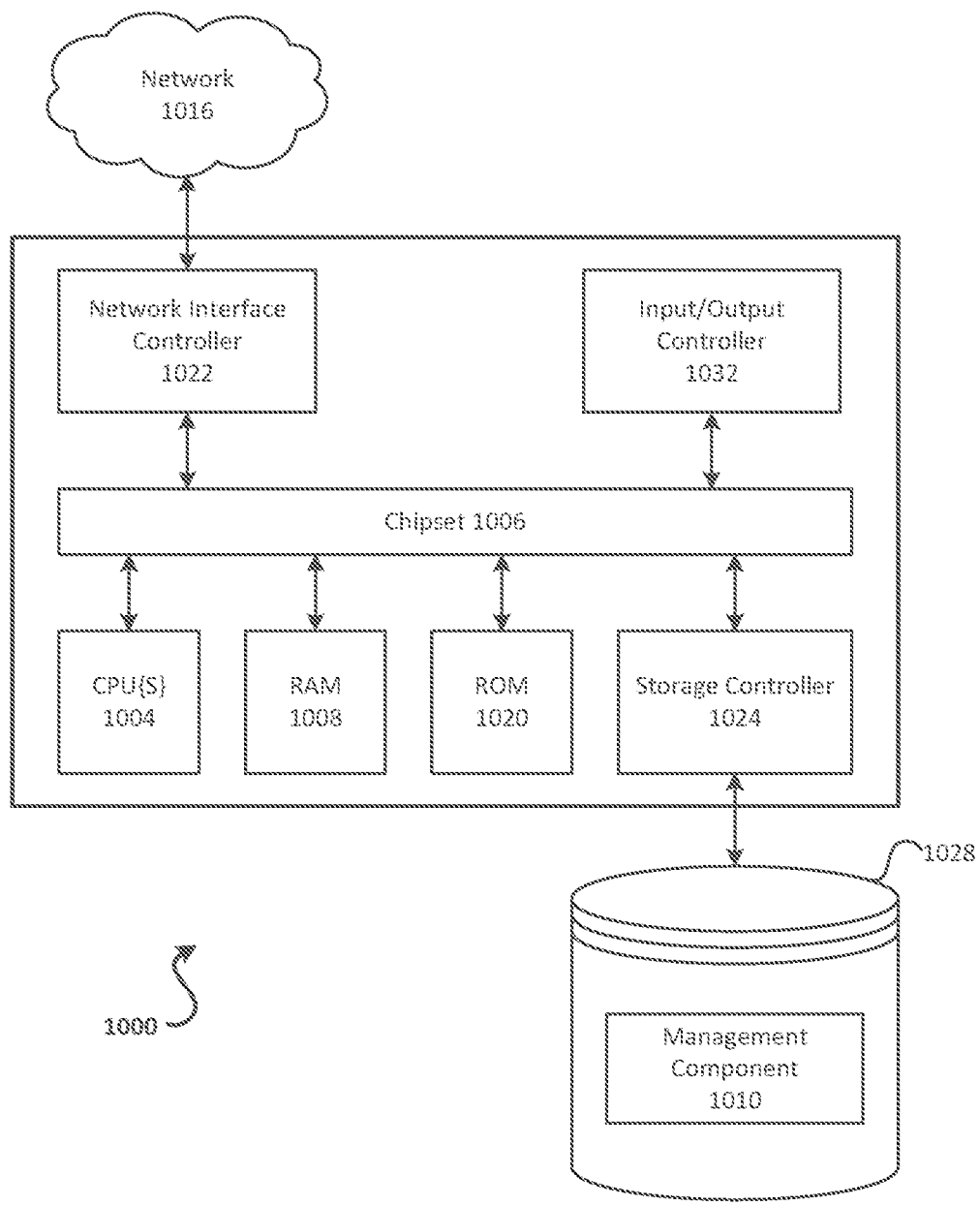
FIG. 10 is a block diagram illustrating an example computing device.

FIG. 10 depicts a computing device that may be used in various aspects, such as the optical devices disclosed herein. Any of the optical elements and/or optical devices may each be implemented in an instance of a computing device 1000 of FIG. 10. The computer architecture shown in FIG. 10 shows a conventional server computer, workstation, desktop computer, laptop, tablet, network appliance, PDA, e-reader, digital cellular phone, or other computing node, and may be utilized to execute any aspects of the computers described herein, such as to implement (e.g., via the computer readable instructions stored and/or managed by the management component 1010) the methods described herein, such as operations performed by a logical unit, operations performed by a control element, operations performed to project optical signals, operations performed to steer optical signals, operations performed to detect optical signals, or a combination thereof.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random access memory (RAM) 1008 used as the main memory in the computing device 1000. The chipset 1006 may further provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN) 1016. The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on a mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1028 by detecting the physical states or characteristics of one or more particular locations within the physical storage units.

In addition to the mass storage device 1028 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described above. The computing device 1000 may have access to computer-readable storage media storing computer-executable instructions, which, when executed by the computing device 1000, may perform the methods described in relation to the optical devices and/or optical elements described herein, such as operations performed by a logical unit, operations performed by a control element, operations performed to project optical signals, operations performed to steer optical signals, operations performed to detect optical signals, or a combination thereof.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A device comprising:
   a first waveguide extending at least in part in a first direction;
   a plurality of second waveguides optically coupled to the first waveguide and extending in a second direction different from the first direction;
   a first plurality of optical elements optically configured to switch optical signals from the first waveguide to corresponding waveguides of the plurality of second waveguides;
   a second plurality of optical elements optically coupled to corresponding waveguides of the plurality of second waveguides and configured to switch optical signals traversing the corresponding waveguides to emitters configured to emit received optical signals; and
   one or more control elements configured to control the first plurality of optical elements and the second plurality of optical elements thereby causing selection of an individual optical element of the second plurality of optical elements to separably control one or more of emission or sensing from the selected optical element, wherein the one or more control elements comprise a first plurality of control switches configured to control activation of corresponding optical elements of the first plurality of optical elements.

2. The device of claim 1, wherein the one or more control elements control beam steering of one or more beams formed based on the emitted optical signals.

3. The device of claim 1, wherein the first plurality of optical elements comprises one or more of an array of optical elements or a matrix of optical elements.

4. The device of claim 1, wherein at least some of the emitters are arranged in a two-dimensional grid pattern.

5. The device of claim 1, wherein the first plurality of optical elements comprises a microring emitter, a microresonator emitter, a microresonator emitter having gratings on the circumference of the microresonator, a microresonator emitter coupled to an emitter, a micro-electromechanical systems optical switch, a phase change material optical routing switch, or an optical routing switch.

6. The device of claim 1, wherein the second plurality of optical elements comprises one or more of an optical switch, an add-drop microresonator, a micro-electromechanical systems optical switch, a phase change material optical routing switch, or an optical routing switch.

7. The device of claim 1, further comprising one or more lenses disposed adjacent the second plurality of optical elements and configured to direct the one or more emitted signals.

8. The device of claim 7, wherein the one or more lenses comprises one or more of a single lens for all of the second plurality of optical elements, a metasurface lens, or a plurality of microlenses.

9. The device of claim 1, further comprising an optical source configured to supply the optical signals to the first waveguide.

10. The device of claim 1, further comprising a detector, wherein the second plurality of optical elements are configured to detect optical signals based on reflections of the emitted optical signals and supply, via corresponding waveguides of the plurality of second waveguides, the detected optical signals to the first waveguide, wherein the first waveguide is at least part of an optical path that supplies the detected optical signals to the detector.

11. The device of claim 1, further comprising a plurality of detector elements separate from the second plurality of optical elements, the second plurality of detector elements being configured to detect optical signals based on reflections of the emitted optical signals.

12. The device of claim 1, further comprising a third plurality of optical elements configured to detect optical signals based on reflections of the emitted optical signals and supply, via one or more waveguides, the detected optical signals to a detector.

13. The device of claim 1, wherein the one or more control elements comprise a second plurality of control switches configured to control activation of individual optical elements of the second plurality of optical elements.

14. The device of claim 1, wherein the second plurality of optical elements are individually controllable to steer optical signals without mechanical elements.

* * * * *